United States Patent [19]

Edwards

[11] 4,359,553

[45] Nov. 16, 1982

[54] POLYETHYLENE EXTRUSION COATING COMPOSITIONS

[75] Inventor: Ray Edwards, Henderson, Tex.

[73] Assignee: Eastman Kodak Company, Rochester, N.Y.

[21] Appl. No.: 301,920

[22] Filed: Sep. 14, 1981

[51] Int. Cl.$^3$ .................... C08L 23/06; C08L 23/12; C08L 23/16

[52] U.S. Cl. .................... 525/240; 525/88

[58] Field of Search .................... 525/240

[56] References Cited

U.S. PATENT DOCUMENTS

| | | | |
|---|---|---|---|
| 3,247,290 | 4/1966 | Werkman et al. | 525/240 |
| 3,254,139 | 5/1966 | Anderson et al. | 525/240 |
| 3,418,396 | 12/1968 | Edwards et al. | 525/240 |
| 3,607,987 | 9/1971 | Walton et al. | 525/240 |

FOREIGN PATENT DOCUMENTS 1316312 12/1962 France.

*Primary Examiner*—Carman J. Seccuro
*Attorney, Agent, or Firm*—Clyde L. Tootle; Daniel B. Reece, III

[57] ABSTRACT

This invention relates to novel low density polyethylene containing blends useful as extrusion coating compositions which provide coatings having good coatability and a broad heat seal range. These coated substrates then can be used in fabricating bags and other packaging applications. These coatings contain a blend of low density polyethylene and a degraded crystalline polypropylene or propylene containing copolymer.

18 Claims, No Drawings

POLYETHYLENE EXTRUSION COATING COMPOSITIONS

This invention relates to novel low density polyethylene blends useful as extrusion coatings which provide coatings having good coatability and a broad heat seal range. One aspect of this invention relates to a blend containing low density polyethylene capable of providing extrusion coatings having good coatability and a broad heat seal range. Another specific aspect of this invention is an extrusion coating composition containing low density polyethylene and degraded crystalline polypropylene or propylene containing copolymer which form extrusion coatings on substrates which have good adhesion to the substrate as well as other excellent physical properties.

Extruding a coating of a polyolefin or blends of polyolefins onto a substrate, such as paper or aluminum foil, to form an extrusion coated substrate is well known in the art. Various polyethylenes and blends of polyethylenes and other polyolefins have been widely used as extrusion coating compositions. However, a polyolefin such as crystalline polypropylene alone, regardless of its molecular weight (flow rate), is not a satisfactory extrusion coating material since it does not have high speed coating ability or a wide range of coating weights. Therefore, many of its excellent physical properties cannot be utilized in extrusion coating applications. In order to improve the coating properties of polypropylene, blends of polyethylene and polypropylene were used as extrusion coating compositions. Note, for example, U.S. Pat. No. 3,418,396 which describes and claims blends of polypropylene and polyethylene having excellent extrusion coating properties. Although the blends disclosed in U.S. Pat. No. 3,418,396 are useful in many applications, they have the disadvantage that such blends when applied as coatings to substrates, such as paper, do not provide the heat seal strength for preparing packaging materials. Moreover, at the present time, there are no coating formulations available commercially that can be used to provide extrusion coatings which will provide both good coatability and a broad heat seal range. Therefore, it would be an advance in the state of the art to provide a low density polyethylene extrusion coating composition that could be applied to substrates and which provide coatings having good adhesion to the substrate, as well as a broad heat seal range.

In accordance with this invention, low density polyethylene extrusion coating compositions are provided which provide coatings having good coatability and a broad heat seal range. Such compositions are obtained from a blend of at least one low density polyethylene and a degraded crystalline polypropylene or propylene containing copolymer. These extrusion coating compositions provide a composition that has excellent adhesion to the substrate as well as other desirable properties. These thin coatings have, in addition to other desirable properties, a broad heat seal range and good adhesion retention characteristics. Such properties are useful in the construction of certain packaging materials. It was surprising that such unexpected results were obtained with the blends of the present invention since a coating containing only the polyethylene did not have the necessary breadth of heat sealability. For example, the polyethylene component alone provided an extrusion coating composition which had good coatability. However, the temperature at which the polyethylene became tacky and then fluid was in a very narrow range. This required that the heat seal temperature be maintained at an exact temperature. Otherwise, the temperature would not be high enough to make the coating tacky and form a bond or too high and cause the coating to be too fluid and not form a bond. Since it is difficult, if not impossible, to maintain the heat seal temperature at a precise temperature in commercial operations, the polyethylene coatings were unacceptable for commercial operations. It was therefore unexpected that the addition of a minor amount of degraded polypropylene or propylene containing copolymer would provide an extrusion coating composition having a broad heat seal range which allows the coating to have good tack and form heat seals over a relatively broad temperature range. These unique blend compositions with which this invention is concerned are as follows:

| Component | Weight Percent Contained in Composition | |
|---|---|---|
| | Broad Range | Preferred Range |
| Low Density Polyethylene | 95–70% | 90–80% |
| Degraded Propylene or Propylene Containing Polymer | 5–30% | 10–20% |

These blends of this invention provide coatings on substrates, such as paper stock, kraft paper, and primed aluminum foils which are useful in fabricating packages. These coated substrates have sufficient adhesion to be useful in applications where handling or flexibility is encountered. For example, such coated substrates can be used to form packages, for example, for water activated chemicals such as denture cleaners, headache and upset stomach nonprescription medicines, packages for foods such as sugar packages, and the like.

The polyethylene component must have a melt index at 190° C. of 10 to 20, a density of above about 0.916 to 0.921 and a melt index recovery of greater than 50, preferably about 70. Polyethylenes having a melt index recovery below 50 do not provide thin coatings of less than 0.5 mils having good neck-in properties, and at commercially acceptable line speeds. Such polyethylenes useful in this invention are prepared by methods known to the art.

The degraded crystalline polypropylene or propylene containing copolymer component has a melt flow rate of 5 to 55 dg/m at 230° C. and is prepared by degrading low flow rate polymers and copolymers prepared with stereospecific catalyst by processes well known to the art. The crystalline undegraded polypropylene having a flow rate of 3 or less, for example, is degraded to a flow rate of about 5 to 55. A crystalline propylene/ethylene copolymer having a flow rate of 3 or less can be degraded to a flow rate of 5 to 55. Such undegraded crystalline propylene containing polymers can be the commercially available crystalline polypropylene, crystalline polypropylene prepared according to U.S. Pat. No. 3,679,775, or crystalline propylene containing copolymers prepared according to U.S. Pat. No. 3,529,037. Particularly useful are crystalline polypropylenes and crystalline ethylene/propylene copolymers containing less than 5 weight percent ethylene.

The polypropylene and propylene containing copolymers can be degraded either thermally or by the use of free radical sources such as peroxides. These processes for degrading low flow rate polymers to prepare high flow rate degraded materials are conventional and well known in the art.

The blends of degraded propylene homo and copolymers and polyethylene have a melt index of from about 2 to about 20. Blends having a melt index of less than 2 have poor coatability, i.e., less than 700 feet per minute. Blends having a melt index greater than 20 do not exhibit a broad heat seal range.

The compositions of the invention may be prepared in various ways such as dry blending and then passing through a compounding extruder, compounding on a milling roll or in a Banbury mixer or by fusion. Any method whereby the components can be blended together will produce the desired blend. For example pellets of each polymer are blended mechanically and the blend is fed to an extruder wherein it is fused and extruded.

Additives, stabilizers, fillers and the like can be added to the compositions of the present invention. Such materials can be present in the components forming the polymer blend, or may be added when the polymers are blended to form the extrusion coating composition.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A polyethylene-degraded polypropylene blend having a melt index of 12 at about 190° C. (ASTM D-1238) was prepared by blending 90% by weight of polyethylene [melt index of 13 dg/min at 190° C., density of 0.917 g/cc (ASTM D-1505)] and a melt index recovery of 70 with 10% by weight of peroxide degraded polypropylene having a 34 flow rate at 230° C. (ASTM D-1238). Melt index recovery is defined as the increase in the diameter of the extrudate over that of the orifice of the extrusion plastometer in ASTM Designation D1238-62T. The diameter of the specimen is measured in the area between 1/16 inch and ⅜ inch of the initial portion of the specimen as it emerges from the extrusion plastometer. Measurements are made by standard methods per ASTM Designation D-374.

This blend of materials was evaluated as follows: each component was fed to a 3½-inch Egan extruder having a barrel length to diameter ratio of 24:1. The four zones of the extruder were maintained, from back to front, at 400° F., 500° F., 600° F., and 630° F. A metering type screw having six compression flights, and 12 metering flights were used. Prior to entering the die the melt passed through one screen of 24×24 mesh. The die was an Egan die, center-fed with 1-inch long lands, with an opening of 16"×0.020". The temperature of the die was held at 600° F. The extrusion rate was held constant at 160 pounds per hour. The resulting film extrudate was passed through a 4½-inch air gap into the nip formed by a rubber-covered pressure roll and a chill roll. At the same time, 40 pound kraft paper stock 16 inches wide was fed into the nip with the pressure roll in contact with the foil. The nip pressure applied was 110 pounds per linear inch. The chill roll was a 24-inch diameter matte finish steel roll, water cooled to maintain a temperature of 60° F. on the roll. The coated paper was taken off the chill roll at a point 180° from the nip formed by the pressure roll and chill roll. The chill roll was operated at linear speeds of about 160 to greater than 700 feet per minute which is the accepted target range for commercial extrusion coatings. For example, at a coating speed of 700 feet per minute the paper stock had a coating of about 0.6 mils. The coating had an excellent adhesion to the paper stock. The heat seal range was broadened 12% from the heat seal range of the straight polyethylene coating . Essentially the same results are obtained when peroxide degraded crystalline propylene/ethylene copolymer is substituted in the above blend for the degraded polypropylene.

EXAMPLE 2

An extrusion coating composition was prepared and tested according to Example 1 except that 85% polyethylene, and 15% degraded crystalline polypropylene were used. The composition was extrusion coated satisfactorily. The heat seal range was increased 23% from the heat seal range of the straight polyethylene coating.

EXAMPLE 3

An extrusion coating composition was prepared and tested according to Example 1 except that 95% polyethylene and 5% degraded crystalline polypropylene were used. The composition was extrusion coated to kraft paper satisfactorily. However, the heat seal range of this extrusion coating was increased only 8% but which is significant.

EXAMPLE 4

An extrusion coating composition was prepared and tested according to Example 1 except that 65% polyethylene, and 35% degraded crystalline propylene/ethylene copolymer were used. The composition was extrusion coated to kraft paper satisfactorily. The heat seal range of this coated material was essentially the same as the straight polyethylene coating.

EXAMPLE 5

An extrusion coating composition was prepared and tested according to Example 1 except that 2.5% peroxide degraded polypropylene and 97.5% polyethylene were used. The composition was extrusion coated to kraft paper satisfactorily. The heat seal range of this coating was essentially the same as the coating formed from polyethylene alone. Essentially the same results are also obtained when peroxide degraded crystalline propylene/ethylene copolymer is substituted in the above blend for the degraded polypropylene.

EXAMPLE 6

An extrusion coating composition was prepared and tested according to Example 1 except that thermally degraded polypropylene was used in place of the peroxide degraded polypropylene. Essentially the same results are obtained. Also, when thermally degraded crystalline propylene/ethylene copolymer is substituted in the above blend for the degraded polypropylene, essentially the same results are obtained.

The invention has been described in detail with particular reference to preferred embodiments thereof, but it will be understood that variations and modifications can be effected within the spirit and scope thereof.

I claim:

1. An extrusion coating composition having a melt index of 2 to 20 dg/min. at 190° C. which provides coatings on substrates having broad heat seal range comprising a blend of: (1) about 5 to 30 percent, by weight, of at least one degraded crystalline polypropylene or ethylene/propylene copolymer containing less than 5 weight percent ethylene, having a melt flow rate of 5 to 55 dg/min. at 230° C., and (2) about 95 to 70 percent, by weight, of at least one polyethylene having a density of 0.916 to 0.920, a melt index at 190° C. of 10 to 20, and a melt index recovery of greater than 50.

2. An extrusion coating composition according to claim 1 wherein said degraded crystalline propylene containing copolymer is crystalline polypropylene.

3. An extrusion coating composition according to claim 2 wherein said degraded crystalline polypropylene has a melt flow rate of 34 at 230° C.

4. An extrusion coating composition according to claim 2 wherein said low density polyethylene has a melt index of 13 dg/min. at 190° C., a density of 0.917 g/cc, and a 70 melt index recovery.

5. An extrusion coating composition according to claim 5 wherein said degraded ethylene/propylene copolymer has a melt flow rate of 30 at 230° C.

6. An extrusion coating composition according to claim 5 wherein said low density polyethylene has a melt index of 13 dg/min. at 190° C., a density of 0.917 g/cc, and a 70 melt index recovery.

7. An extrusion coating composition having a melt index of 2 to 20 dg/min. at 190° C. which provides coatings of less than 1 mil which have heat seal strengths of at least 10 pounds per linear inch comprising a blend of: (1) about 10 to 20 percent, by weight, of at least one degraded crystalline polypropylene or ethylene/propylene copolymer containing less than 5 weight percent ethylene, having a melt flow rate of 5 to 55 dg/min. at 230° C., and (2) about 90 to 80 percent, by weight, of at least one polyethylene having a density of about 0.916 to about 0.920, a melt index at 190° C. of 10 to 20, and a melt index recovery of greater than 50.

8. An extrusion coating composition according to claim 7 wherein said degraded crystalline propylene containing copolymer is crystalline polypropylene.

9. An extrusion coating composition according to claim 8 wherein said degraded crystalline polypropylene has a melt flow rate of 34 at 230° C.

10. An extrusion coating composition according to claim 8 wherein said low density polyethylene has a melt index of 13 dg/min. at 190° C., a density of 0.917 g/cc, and a 70 melt index recovery.

11. An extrusion coating composition according to claim 5 wherein said degraded crystalline polypropylene copolymer has a melt flow rate of 30 at 230° C.

12. An extrusion coating composition according to claim 5 wherein said low density polyethylene has a melt index of 13 dg/min. at 190° C., a density of 0.917 g/cc, and a 70 melt index recovery.

13. An extrusion coating composition having a melt index of 12 dg/min. at 190° C. which provides coatings of less than 1 mil which have heat seal strengths of at least 10 pounds per linear inch comprising a blend of: (1) about 10 percent, by weight, of at least one degraded crystalline polypropylene or ethylene/propylene copolymer containing less than 5 weight percent ethylene, having a melt flow rate of 35 dg/min. at 230° C., and (2) about 90 percent, by weight, of at least one polyethylene having a density of about 0.917, a melt index at 190° C. of 13, and a melt index recovery of 70.

14. An extrusion coating composition according to claim 1 wherein said degraded crystalline propylene containing copolymer is crystalline polypropylene.

15. An extrusion coating composition according to claim 2 wherein said degraded crystalline polypropylene has a melt flow rate of 34 at 230° C.

16. An extrusion coating composition according to claim 2 wherein said low density polyethylene has a melt index of 13 dg/min. at 190° C., a density of 0.917 g/cc, and a 70 melt index recovery.

17. An extrusion coating composition according to claim 5 wherein said degraded crystalline polypropylene has a melt flow rate of 30 at 230° C.

18. An extrusion coating composition according to claim 5 wherein said low density polyethylene has a melt index of 13 dg/min. at 190° C., a density of 0.917 g/cc, and a 70 melt index recovery.

* * * * *

UNITED STATES PATENT AND TRADEMARK OFFICE
CERTIFICATE OF CORRECTION

PATENT NO. : 4,359,553

DATED : November 16, 1982

INVENTOR(S) : Ray Edwards

It is certified that error appears in the above—identified patent and that said Letters Patent is hereby corrected as shown below:

Column 5, line 23, "Claim 5" should be ---Claim 1---.

Column 6, line 9, "Claim 5" should be ---Claim 1---.

Column 6, line 12, "Claim 5" should be ---Claim 1---.

Column 6, line 37, "Claim 5" should be ---Claim 1---.

Column 6, line 40, "Claim 5" should be ---Claim 1---.

Signed and Sealed this

Twenty-second Day of February 1983

[SEAL]

Attest:

GERALD J. MOSSINGHOFF

*Attesting Officer*     *Commissioner of Patents and Trademarks*